J. H. MULLIN.
SPRING WHEEL.
APPLICATION FILED AUG. 9, 1919.
1,359,825.
Patented Nov. 23, 1920.
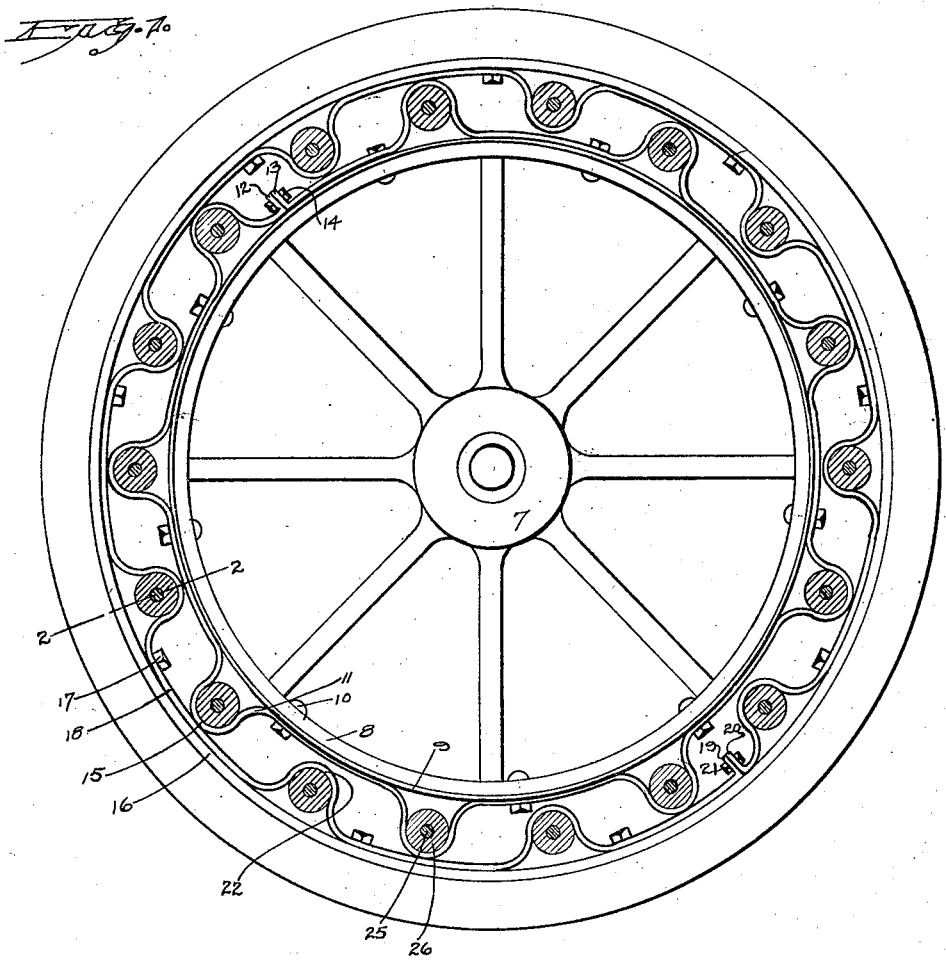
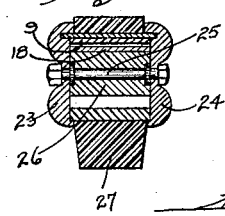 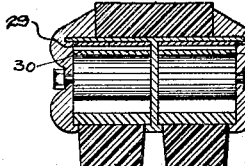 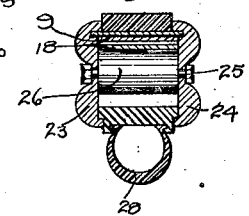
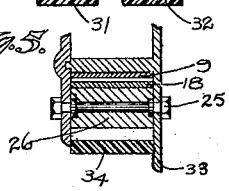
Inventor
Joseph H. Mullin
by Seymour & Earle
Atty

UNITED STATES PATENT OFFICE.

JOSEPH H. MULLIN, OF NEW HAVEN, CONNECTICUT, ASSIGNOR OF ONE-HALF TO THOMAS REILLY, OF NEW HAVEN, CONNECTICUT.

SPRING-WHEEL.

1,359,825.  Specification of Letters Patent.  Patented Nov. 23, 1920.

Application filed August 9, 1919. Serial No. 316,507.

*To all whom it may concern:*

Be it known that I, JOSEPH H. MULLIN, a citizen of the United States, residing at New Haven, in the county of New Haven and State of Connecticut, have invented a new and useful Improvement in Spring-Wheels; and I do hereby declare the following, when taken in connection with the accompanying drawings and the characters of reference marked thereon, to be a full, clear, and exact description of the same, and which said drawings constitute part of this application, and represent, in—

Figure 1, side view partly in section of a wheel constructed in accordance with my invention.

Fig. 2, a sectional view on the line 2—2 of Fig. 1.

Fig. 3, a sectional view of a wheel constructed in accordance with my invention and equipped with dual-tires.

Fig. 4, a similar view indicating use of pneumatic tire.

Fig. 5, a sectional view indicating my invention applied to a railway car-wheel.

This invention relates to an improvement in spring wheels, in which the springs are arranged between the wheel-rim and a tire-rim. The object of the invention is to produce a wheel which will be sufficiently rigid to withstand the necessary strain, and at the same time provide a yielding rim to insure comfort in traveling, and the invention consists in the construction hereinafter described and particularly recited in the claims.

In carrying out my invention, I employ a wheel 7 having a felly 8 and a wheel rim 9. Resting upon and secured to the wheel-rim 9 by bolts 10 in a wheel rim spring 11, the ends 12 and 13 of which are turned outward and connected by a bolt 14. At intervals the spring 11 is formed with outward bends 15. Around the wheel-rim is a tire-rim 16, and secured to the inner face of this rim by bolts 17, is a tire-rim spring 18, the ends 19 and 20 of which are turned inward and secured together by a bolt 21. This tire-rim spring 18 is formed with inward bends 22 corresponding to the bends 15 in the wheel-rim spring 11 between which they extend. On each side of the rims, plates 23 and 24 are placed overlapping the edges of the rims and connected together by bolts 25 which extend through the bends in the springs, and on each bolt is a rubber buffer 26 corresponding in size to the bends in the springs into which they fit. While with the use of my improved springs a solid rubber tire 27 produces good results a pneumatic tire 28 may be used as indicated in Fig. 4, and for heavy vehicles I may employ two sets of springs 29 and 30 and dual tires 31 and 32, while for railway car wheels, one of the plates will be formed by a flange 33 which will project beyond the tread 34 in the usual manner.

I claim:

1. A spring wheel comprising a wheel rim and a tire rim, a spring secured directly to the said wheel rim and formed with outward bends, a spring secured directly to the tire rim and formed with inward bends, the bends in one spring arranged alternately with the bends in the other spring, the bends in each spring having a bearing against the unbent portion of the other spring.

2. A spring wheel comprising a wheel rim and a tire rim, springs secured to the said rims, and each formed with bends, the bends in one spring arranged alternately with the bends in the other spring, rim plates applied to opposite sides of the rims and secured together by transverse bolts extending through said bends, and rubber buffers on each of said bolts.

In testimony whereof, I have signed this specification in the presence of two subscribing witnesses.

J. H. MULLIN.

Witnesses:
 FREDERIC C. EARLE,
 CLARA L. WEED.